US006859851B1

(12) United States Patent
Sheaffer (10) Patent No.: US 6,859,851 B1
(45) Date of Patent: Feb. 22, 2005

(54) BUFFER PRE-LOADING FOR MEMORY SERVICE INTERRUPTIONS

(75) Inventor: Gad S. Sheaffer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/466,964

(22) Filed: Dec. 20, 1999

(51) Int. Cl.[7] ................................................. G06F 3/00
(52) U.S. Cl. ............................. 710/52; 710/47; 710/48; 710/54; 710/56; 710/57; 711/100; 711/101; 711/117; 711/170
(58) Field of Search ....................... 710/46–48, 52–59; 711/100–173

(56) References Cited

U.S. PATENT DOCUMENTS

| | | | | |
|---|---|---|---|---|
| 5,179,707 A | * | 1/1993 | Piepho ....................... 710/260 |
| 5,210,829 A | * | 5/1993 | Bitner ......................... 710/57 |
| 5,367,689 A | * | 11/1994 | Mayer et al. ................ 710/260 |
| 5,412,780 A | * | 5/1995 | Rushton ...................... 711/113 |
| 5,542,076 A | * | 7/1996 | Benson et al. .............. 710/260 |
| 5,566,315 A | * | 10/1996 | Milillo et al. ................ 711/113 |

* cited by examiner

Primary Examiner—Fritz Fleming
Assistant Examiner—Mike Nguyen
(74) Attorney, Agent, or Firm—Kenyon & Kenyon (57) ABSTRACT

Methods and apparatus control the loading of a memory buffer. The memory buffer may have a watermark with a first watermark value and can receive an advance indication of a memory service interruption. Based at least in part on the received advance indication of the memory service interruption, the watermark can be modified to have a second watermark value different from the first watermark value.

30 Claims, 5 Drawing Sheets

BUFFER PRE-LOADING FOR MEMORY SERVICE INTERRUPTIONS

FIELD OF THE INVENTION

Embodiments of the present invention provide a method and apparatus for memory buffer pre-loading. More particularly, embodiments of the present invention provide methods and apparatus for memory buffer pre-loading for memory service interruptions.

BACKGROUND OF THE INVENTION

In known systems including a memory that handles real time data streams, memory buffers are implemented in conjunction with the memory to handle the real time data stream. For example, a real time data stream is handled by a memory of a computer system when the memory receives and temporarily stores video data. The video data may be received from graphics processing circuitry (e.g., a graphics coprocessor, a general purpose microprocessor that can perform graphics operations, etc.), from a video capture device (e.g., a video camera, etc.), from a communications network (e.g., a cable network, the Internet, etc.), and other known video data sources. After the video data is temporarily stored by the memory, it may be read from the memory and sent to a video display, to data storage (e.g., a hard disk, a Digital Versatile Disk (DVD), etc.), over a communications network, etc.

A memory service interruption can result in the memory being unable to handle real time data streams. Memory buffers may be implemented to handle the real time data streams during the memory service interruptions. For example, a memory buffer can be implemented to receive video data. Video data to be written to a memory can be received by a write memory buffer, which temporarily holds received video data until the video data can be written to the memory. Likewise, video data to be read from a memory may be sent to a read memory buffer, which temporarily holds the read video data until the video data is sent to a video display.

Memory buffers can be sized to handle the memory data demands that can occur during a memory service interruption. For example, a read memory buffer (i.e., read buffer) can have a physical capacity of two kilobytes to hold 256 quadwords (a quadword can correspond to eight bytes). The read buffer also can have a watermark with a set value. The watermark value may equal the number of valid data entries (e.g., quadwords, bytes, etc.) that the buffer should contain prior to a memory service interruption. For example, when 192 data entries are to be read from the memory buffer during the pendency of a worst case memory service interruption, then the watermark of the read buffer can be set at 192 data entries.

Figure 1:
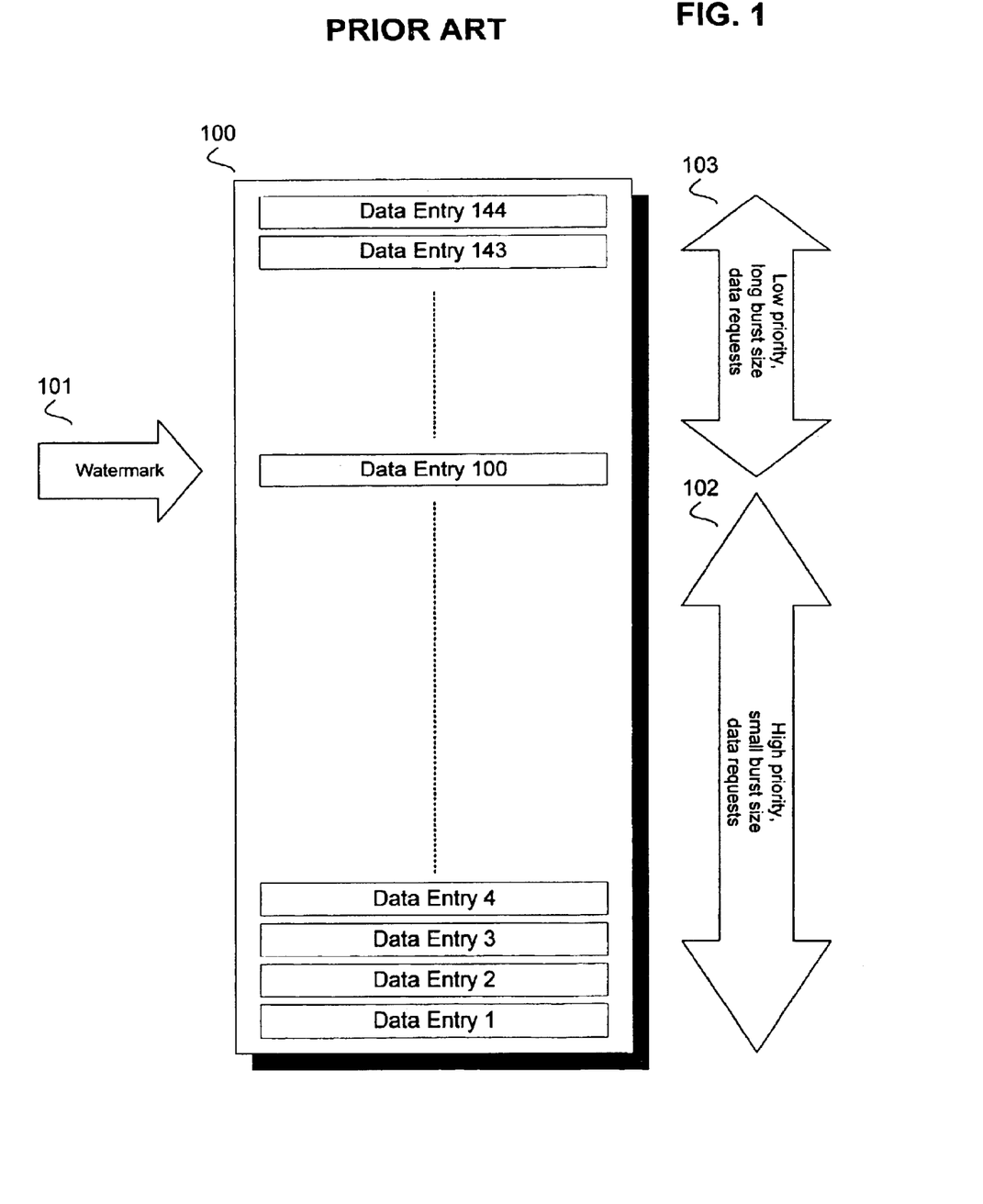
FIG. 1 is an illustration of the operation of a known memory buffer.

FIG. 1 is an illustration of the operation of a known memory buffer. Memory buffer 100 is a read buffer with a physical capacity of holding 144 data entries. Memory buffer 100 is operated with a watermark 101. The watermark 101 has a value corresponding to 100 data entries. Memory buffer operations can be performed to read data entries from the memory into the read buffer such that the read buffer typically is filled to the watermark level (e.g., has at least 100 data entries). When the number of data entries in the read buffer falls below the watermark level (e.g., less than 100 data entries), then high priority, short burst size data requests 102 can be generated to read data entries from the memory into the read buffer. When the number of data entries in the read buffer is equal to or greater than the watermark level (e.g., 100 or more data entries), then low priority, long burst size data requests 103 can be generated to continue to fill the read buffer.

Thus, known memory buffers that handle real time data streams can be filled and allowed to drain to a watermark. The value of the watermark can be set so that the buffer can sustain the worst case latency to memory. Known systems can have both a worst case latency to memory and a regular memory latency. System performance can be disadvantageously affected when memory service interruptions occur, but memory buffer operations are performed to keep the memory buffer at watermark corresponding to the worst case latency to memory. Maintaining a watermark at a higher level can disadvantageously affect system performance by generating a greater number of high priority, short burst size data requests, which can result in a lower page hit rate to memory.

In view of the foregoing, it can be appreciated that a substantial need exists for a method and apparatus which can more efficiently and effectively manage memory buffer operations.

SUMMARY OF THE INVENTION

Embodiments of the present invention provide methods and apparatus to control the loading of a memory buffer. An advance indication of a memory service interruption can be received by a memory buffer. The memory buffer may have a watermark with a first watermark value. The watermark can be modified to have a second watermark value different from the first watermark value based at least in part on the received advance indication of the memory service interruption.

DETAILED DESCRIPTION

Embodiments of methods and systems for memory buffer pre-loading for memory service interruptions are described. In the following description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

Figure 2:
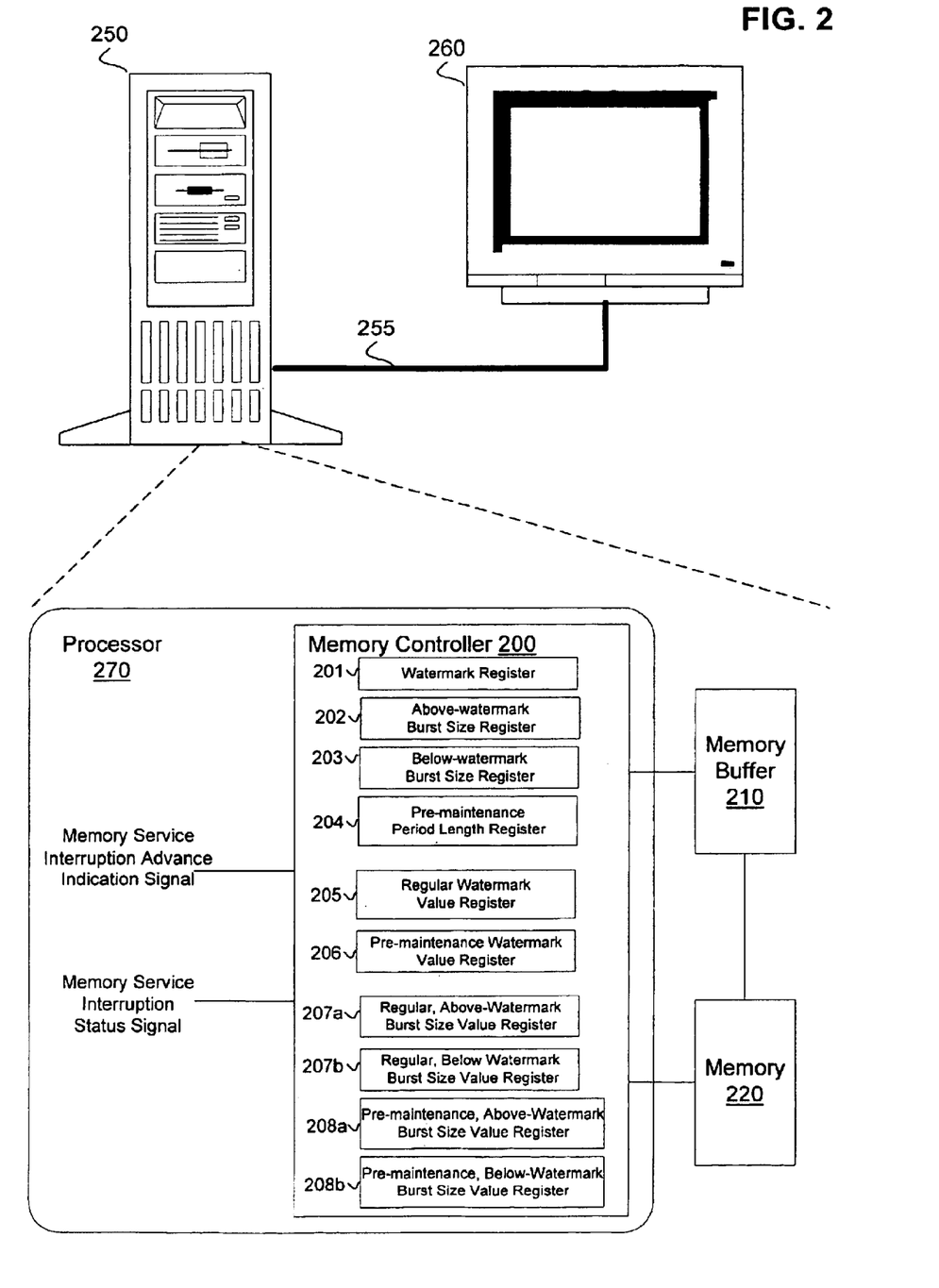
FIG. 2 shows an illustration of a system in accordance with an embodiment of the present invention.

FIG. 2 shows an illustration of a system in accordance with an embodiment of the present invention. Computer 250 may be coupled to a video display 260 via an external computer bus 255. Computer 250 can include a processor 270, such as the Pentium® III processor manufactured by Intel Corp. of Santa Clara, Calif. In another embodiment, the processor can be an Application Specific Integrated Circuit (ASIC). Computer 250, in one embodiment, includes a memory 220 coupled to the processor 270. The term "coupled" means connected directly or indirectly. The memory 220 is any device adapted to store digital information, such as Dynamic Random Access Memory (DRAM), Rambus® DRAM (RDRAM®), flash memory, a hard disk, an optical digital storage device, or a combination thereof, etc. Rambus® technology is licensed by Rambus Inc. of Mountain View, Calif., and both Rambus® and RDRAM® are registered trademarks of Rambus Inc. The external computer bus 255 can be an Advanced Graphics Port (AGP) compliant bus.

Processor 270, in one embodiment, includes memory controller 200. In one embodiment, processor 270 is an integrated processor including a graphics module (e.g., a graphics engine) and a memory controller, and is coupled to a Unified Memory Architecture (UMA) memory. In accordance with one embodiment of the present invention, a UMA memory can store a frame buffer (e.g., a section of memory used to store an image to be displayed on a video monitor and/or parts of the image that lie outside the limits of the display, etc.). In one embodiment, the integrated processor can include a processor core, such as a Pentium® processor core. In another embodiment, a processor does not include a memory controller, but is coupled to a memory controller.

Memory controller 200 can be coupled to memory buffer 210 and memory 220. Memory buffer 210 may be coupled to memory 220 to allow data entries to be transferred between memory buffer 210 and memory 220. When memory buffer 210 is a read buffer, memory controller 200 can generate requests of varied priority (e.g., a high priority request, a low priority request, an intermediate priority request, etc.) to fill the memory buffer 210 with data entries from the memory 220. In one embodiment, the memory buffer 210 handles a real time video data stream that is being read from memory 220 and written to video display 260.

Memory controller 200, in one embodiment, includes a watermark register 201 to store a current value of the watermark of the memory buffer 210. The memory controller 200 can also include an above-watermark burst size register 202 and a below-watermark burst size register 203. When the number of valid data entries in the memory buffer 210 falls below the watermark, a high priority data request to fill the memory buffer 210 can be generated with a below-watermark burst size. The below-watermark burst size can be stored in the below-watermark burst size register 203, which can be a five bit register, for example, that specifies up to 32 different burst sizes. When the number of valid data entries in the memory buffer 210 is above the watermark, a low priority data request to fill the memory buffer 210 can be generated with an above-watermark burst size. The above-watermark burst size can be stored in the above-watermark burst size register 202, which can be a five bit register, for example, that specifies up to 32 different burst sizes.

In one embodiment, the memory 220 includes RDRAM. Operation of RDRAM can include a regular memory latency and a worst case latency to memory. The regular memory latency can be caused by the Rambus memory controller and memory devices. The worst case latency to memory can be caused in part by RDRAM maintenance operations that cause the memory to shut down and not serve memory requests for a period of time. RDRAM maintenance operations can include memory controller temperature calibration, memory device temperature calibration, memory controller current calibration, memory device current calibration, DLL (Delay Loop Line) refresh for device(s) in the Nap mode, memory refresh, etc. In known RDRAM implementations, RDRAM memory maintenance operations may occur every 100 milliseconds and have durations of up to 2.5 microseconds.

The memory buffer 210 can typically be operated based on the regular memory latency. During such operation, the watermark of memory buffer 210 can have a regular watermark value, the above-watermark burst size can have a regular above-watermark burst size value, and the below-watermark burst size can have a regular below-watermark burst size value. In one embodiment, the regular watermark value is stored in the regular watermark value register 205, the regular above-watermark burst size value is stored in the regular, above-watermark burst size value register 207a, and regular below-watermark burst size value is stored in the regular, below-watermark burst size value register 207b. When the memory buffer 210 is operating based on the regular memory latency, the watermark register 201 can contain the regular watermark value, the above-watermark burst size register 202 can contain the regular above-watermark burst size value, and the below-watermark burst size register 203 can contain the regular below-watermark burst size value.

The memory controller 200, in one embodiment, receives a memory service interruption advance indication signal that can provide advance warning that a memory service interruption having a worst-case latency to memory will occur. The amount of time the advance warning precedes the memory service interruption having a worst-case latency to memory can be varied based on system requirements, performance parameters, etc. For example, the memory service interruption indication signal can provide an advance indication that an RDRAM maintenance operation will be performed, and the timing of the advance indication can be based on a pre-maintenance period length value stored in pre-maintenance period length register 204. Subsequent to receiving the indication that an RDRAM maintenance operation will be performed, the memory controller 200 can modify the watermark value, the above-watermark burst size value, and the below-watermark burst size value of memory buffer 210. The pre-maintenance watermark value stored in the pre-maintenance watermark value register 206 can be written to the watermark register 201, and the pre-maintenance, above-watermark burst size value stored in the pre-maintenance, above-watermark burst size value register 208a can be written to the above-watermark burst size register 202, and the pre-maintenance, below-watermark burst size value stored in the pre-maintenance, below-watermark burst size value register 208b can be written to the below-watermark burst size register 203. In another embodiment, the above-watermark burst size and/or the below-watermark burst-size can be constant and hardwired, rather than variable and stored in a register.

Subsequent to modifying the watermark from the regular value to the pre-maintenance value, the memory controller 200 can generate high priority, below-watermark burst size requests to fill the memory buffer 210 to the pre-maintenance watermark level when the level of memory buffer 210 is below the pre-maintenance watermark level. When the memory buffer 210 is filled above the pre-maintenance watermark level, the memory controller 200 can generate low priority, pre-maintenance above-watermark burst size requests to fill the memory buffer 210.

The memory controller 200, in one embodiment, receives a memory service interruption status signal that can provide status information about a memory service interruption having a worst-case latency to memory. For example, the memory service interruption status signal can indicate when an RDRAM maintenance operation is being performed. In one embodiment, the memory service interruption status signal goes high at the onset of an RDRAM maintenance operation and goes low at the termination of an RDRAM maintenance operation. Subsequent to receiving an indication that the RDRAM maintenance operation has terminated, the memory controller 200 can modify the watermark value, the above-watermark burst size value, and the below-watermark burst size value to their respective regular values. The regular watermark value stored in the regular watermark value register 205 can be written to the watermark register 201, the regular, above-watermark burst size value stored in the regular, above-watermark burst size value register 207a can be written to the above-watermark burst size register 202, and the regular, below-watermark burst size value stored in the regular, below-watermark burst size value register 207b can be written to the below-watermark burst size register 203.

Figure 2A:
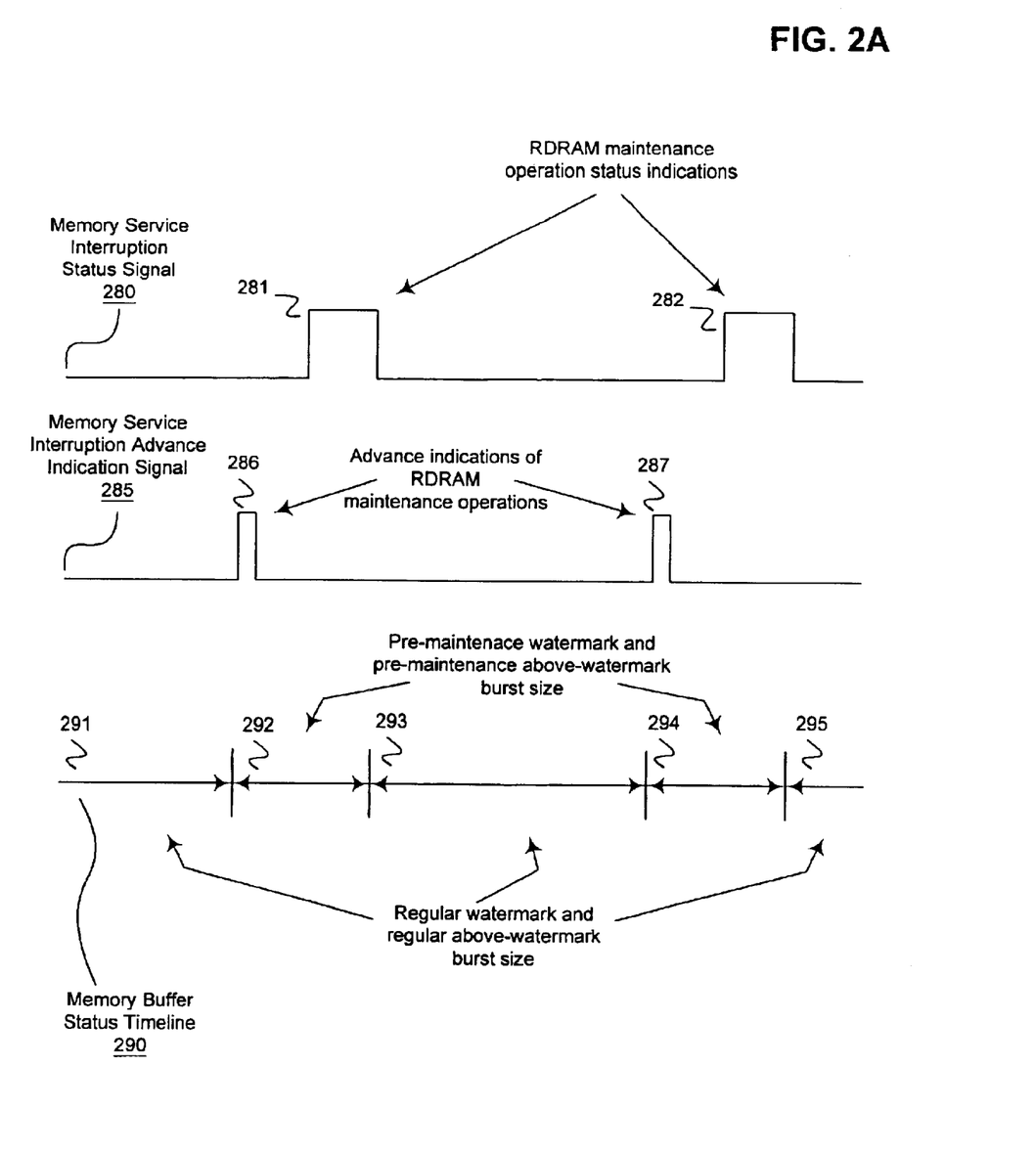
FIG. 2A shows signals received by an apparatus in accordance with an embodiment of the present invention.

FIG. 2A shows signals received by an apparatus in accordance with an embodiment of the present invention. Memory service interruption status signal 280 can go high during an RDRAM maintenance operation. In other embodiments of the present invention, the memory service interruption status signal can indicate the status of another memory maintenance operation, a Rambus dynamic random access memory maintenance operation, a memory device temperature calibration, a memory device current calibration, a memory refresh, etc. In one embodiment, the memory service interruption status signal 280 is generated by a timer and can cause initiation of the RDRAM maintenance operation. The transition of the memory service interruption status signal 280 from low to high can indicate the onset of an RDRAM maintenance operation. The transition of the memory service interruption status signal 280 from high to low can indicate the termination of an RDRAM maintenance operation. Status indications 281 and 282 each correspond to the pendency of an RDRAM maintenance operation. In one embodiment, status indications 281 and 282 are 100 milliseconds apart and each have a duration of 2.5 milliseconds. In other embodiments, the timing and duration of status indications can vary based on system parameters, performance requirements, etc.

Memory service interruption advance indication signal 285 can go high prior to an RDRAM maintenance operation to provide an advance indication of an upcoming RDRAM maintenance operation. In other embodiments of the present invention, a memory service interruption indication signal can include an indication of a memory maintenance operation, an indication of a Rambus dynamic random access memory maintenance operation, an indication of a memory device temperature calibration, an indication of a memory device current calibration, an indication of a memory refresh, etc. In one embodiment, the memory service interruption advance indication signal 285 is generated by a timer. Advance indication 286 provides an advance warning of the RDRAM maintenance operation corresponding to status indication 281. Likewise, advance indication 287 provides an advance warning of the RDRAM maintenance operation period corresponding to status indication 282. In one embodiment, advance indications 286 and 287 are 100 milliseconds apart and can have a duration of 5 milliseconds. In another embodiment, advance indications 286 and 287 stay high until the end of the memory service interruption. Advance indications 286 and 287 respectively can precede status indications 281 and 282 by approximately 500 nanoseconds. In other embodiments, the timing and duration of advance indications can vary based on system parameters, performance requirements, etc.

Memory buffer status timeline 290 includes timeline segments 291, 292, 293, 294, and 295. During timeline segment 291, the memory buffer 210 is operated with the regular watermark and the regular burst sizes. Timeline segment 291 ends, and timeline segment 292 begins, with the onset of advance indication 286. In response to advance indication 286, the memory controller 200 modifies the watermark value and the burst size values and operates the memory buffer 210 during timeline segment 292 with the pre-maintenance watermark and the pre-maintenance burst sizes. Timeline segment 292 ends, and timeline segment 293 begins, when status indication 281 terminates. In response to the termination of status indication 281, the memory controller 200 modifies the watermark value and the burst size values and operates the memory buffer 210 during timeline segment 293 with the regular watermark and the regular burst sizes. In another embodiment where the advance indications 286, 287 of memory service interruption advance indication signal 285 stay high until the end of the memory service interruption, when the advance indications 286, 287 end (e.g., the memory service interruption advance indication signal 285 goes low, etc.), the memory controller 200 can modify the watermark value and the burst size values and operates the memory buffer 210 during timeline segment 293 with the regular watermark and the regular burst sizes. The operation of the memory buffer 210 during timeline period 294 corresponds to the operation of the memory buffer during timeline period 292. Likewise, the operation of the memory buffer 210 during timeline period 295 corresponds to the operation of the memory buffer during timeline period 293.

Figure 3:
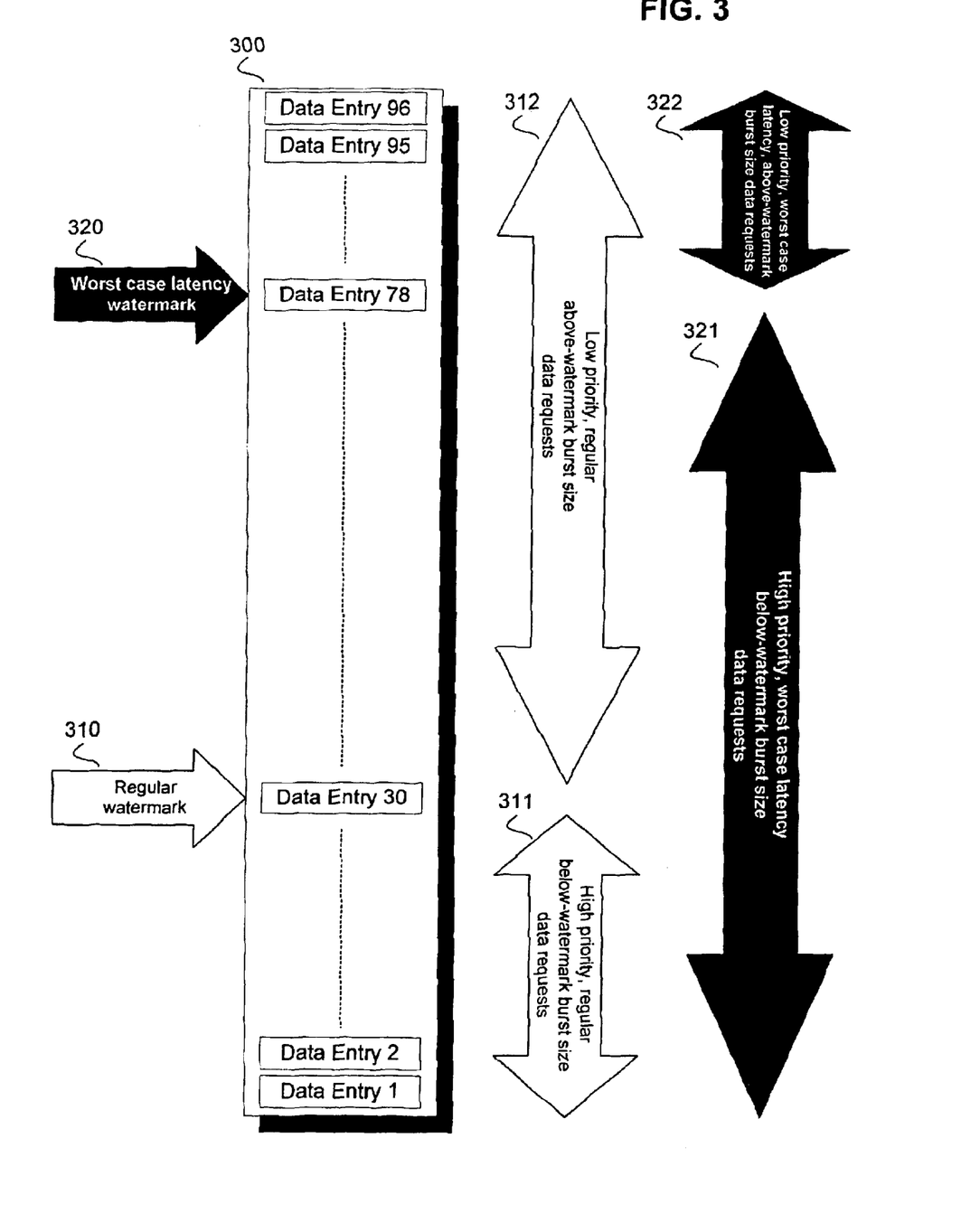
FIG. 3 shows an illustration of the operation of a memory buffer in accordance with an embodiment of the present invention.

FIG. 3 shows an illustration of the operation of a memory buffer in accordance with an embodiment of the present invention. Memory buffer 300 can be a read buffer that buffers a real time video stream that is stored in a memory and being sent to a video display (e.g., video display 260 of FIG. 2). Memory buffer 300 can be filled with 96 data entries, each data entry being a quadword of eight bytes. The memory buffer can typically be operated to handle a memory service interruption having a regular memory latency. For example, in one embodiment, the memory buffer 300 can be filed to the regular watermark 310 level (i.e., be filled with 30 data entries) to handle a memory service interruption having a regular memory latency. In such a regular mode of operation, when the level of the memory buffer falls below the regular watermark 310, then high priority, regular below-watermark, burst size data requests (illustrated by label 311) are generated by a memory controller (e.g., memory controller 200 of FIG. 2) to fill the memory buffer. In one embodiment, the regular below-watermark burst size is 8 data entries. In other embodiments, the regular below-watermark burst size can include a different number of data entries based on system parameters, performance requirements, etc.

When the level of the memory buffer 300 is above the regular watermark 310 during the regular mode of operation, then low priority, regular above-watermark burst size data requests (illustrated by label 312) are generated by a memory controller to fill the memory buffer. The size of the buffer can be computed so that there is enough space between the top of the buffer and the regular watermark to work most of the time using low priority, regular above-watermark burst size data requests. In one embodiment, when the regular memory latency is 500 nanoseconds and the regular watermark level is 30 data entries, then the memory buffer size is 96 data entries and the regular above-watermark burst size is 24 data entries or the number of empty buffer entries. In other embodiments, the buffer size and burst sizes can vary based on system parameters, performance requirements, etc.

To handle the longer memory latency associated with memory service interruption having a worst case latency to memory (e.g., an RDRAM maintenance operation), the value of the watermark and the above-watermark and below-watermark burst sizes can be changed. In one embodiment, 0.5 milliseconds (or another value stored in pre-maintenance period length register 204 by a driver) before a worst case latency to memory service interruption, operation of the memory buffer can be modified to handle the worst case latency to memory. For example, in one embodiment, the memory buffer 300 should be filled to the worst case latency watermark 320 level (e.g., be filled with 78 data entries) to handle a memory service interruption having a worst case latency to memory of 2 milliseconds. Thus, the value of the memory buffer watermark level is changed from the regular watermark level (e.g., 30 data entries) to the worst case latency watermark level (e.g., 78 data entries). The increased level of the watermark (e.g., an additional 48 data entries) can cover the additional latency caused by a worst case latency to memory service interruption.

In such a worst case latency mode of operation, when the level of the memory buffer falls below the worst case latency watermark 320, then high priority, worst case latency below-watermark burst size data requests (illustrated by label 321) are generated by a memory controller to fill the memory buffer. When the level of the memory buffer 300 is above the worst case latency watermark 320 during the worst case latency mode of operation, then low priority, worst case latency above-watermark burst size data requests (illustrated by label 322) are generated by a memory controller to fill the memory buffer. In one embodiment, the worst case latency, above-watermark burst size equals the difference between the size of the memory buffer and the worst case latency watermark level. For example, in the embodiment illustrated in FIG. 3, the worst case latency, above-watermark burst size can be 18 data entries (i.e., 96 data entries−78 data entries= 18 data entries). Such a burst size can have the effect of keeping the buffer as full as possible.

The embodiment of the present invention illustrated in FIG. 3 is a read memory buffer that is operated to be filled with a certain number of data entries to handle memory service operations (e.g., a memory service interruption). Other embodiments of the present invention can encompass control of other memory buffers, such as write memory buffers. In a write memory buffer, a watermark can be set to operate the write memory buffer such that a certain number of memory locations are available to receive data entries to be written to the memory. For example, a write memory buffer may receive a real time video stream from a video capture device (e.g., a video camera), a video communications device (e.g., a cable television network connection), or another known source of video data. During a memory service interruption, the write memory buffer should have adequate capacity to handle the real time data stream that is to be written to the memory. Thus, in one embodiment of the present invention, a write memory buffer is operated to handle a regular memory latency. An indication of a memory service interruption having a different latency to memory is received, and the operation of the write memory buffer is modified (e.g., watermark value modified, burst size values modified, etc.) to handle the different latency to memory.

Figure 4:
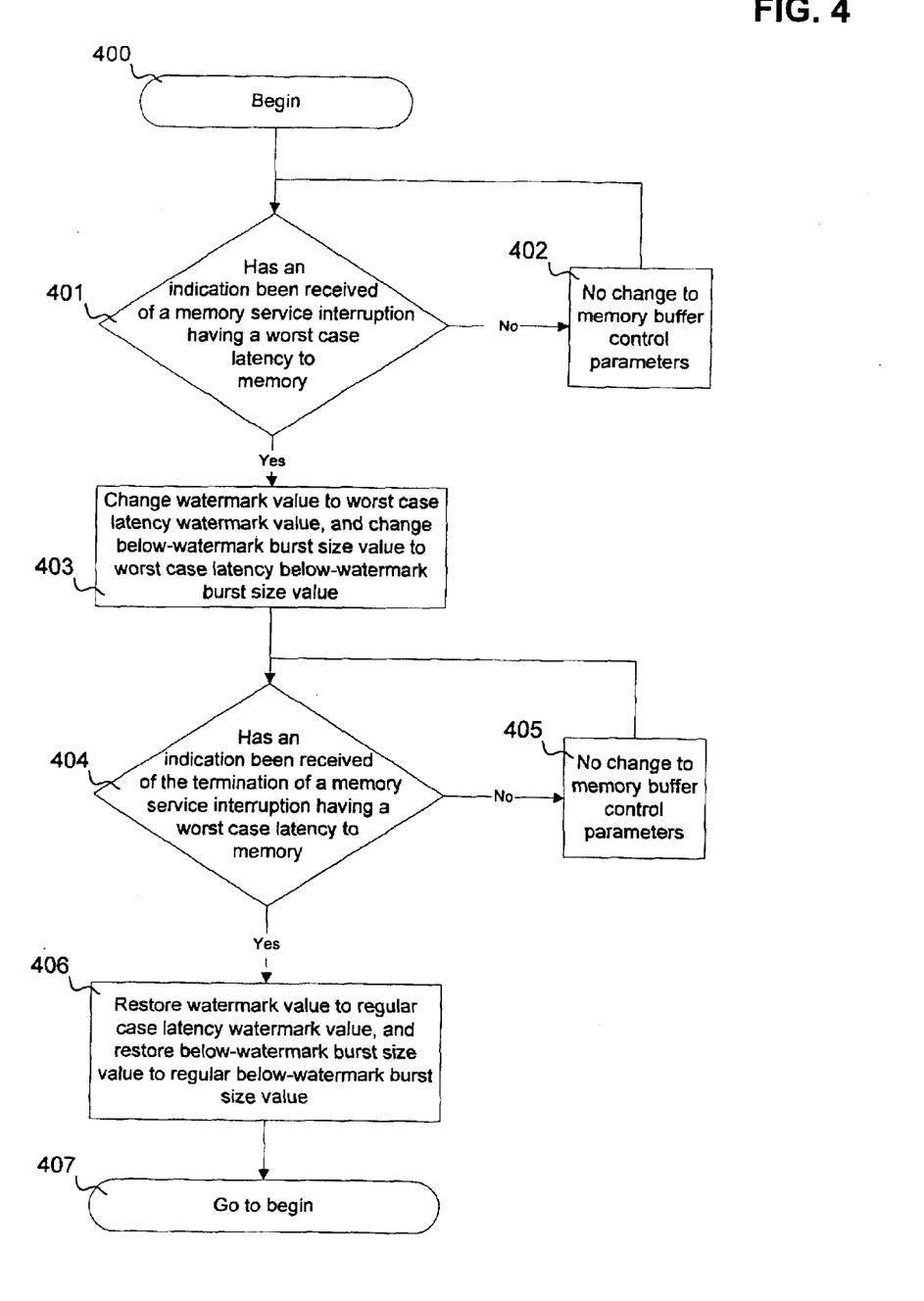
FIG. 4 shows a method in accordance with an embodiment of the present invention.

FIG. 4 shows a method in accordance with an embodiment of the present invention. In one embodiment of the present invention, a method can be implemented by instructions to be executed by a processor. At block 400, a memory buffer (e.g., a memory buffer 210 of FIG. 2) is operating in a regular memory latency mode. The memory buffer's watermark has a regular watermark value and the below-watermark burst size has a regular below-watermark burst size value. At block 401, a memory controller (e.g., a memory controller 200 of FIG. 2) determines whether an indication of a memory service interruption having a worst case latency to memory has been received. If no such indication has been received, then there is no change to the memory buffer control parameters (e.g., the watermark, the below-watermark burst size, etc.), (block 402), and the buffer continues to operate in the regular memory latency mode until such an indication has been received. If an indication of a memory service interruption having a worst case latency to memory has been received, then the watermark value is changed to the worst case latency watermark value and the below-watermark burst size is changed to the worst case latency burst size value (block 403). Subsequent to execution of block 403, the memory buffer is operating in worst case latency mode.

At block 404, the memory controller determines whether an indication of the termination of the memory service interruption having a worst case latency to memory has been received. If no such indication has been received, then there is no change to the memory buffer control parameters (e.g., the watermark, the below-watermark burst size, etc.), (block 405), and the buffer continues to operate in the worst case latency mode until such an indication has been received. If an indication of the termination of a memory service interruption having a worst case latency to memory has been received, then the watermark value is restored to the regular watermark value and the below-watermark burst size restored to the regular below-watermark burst size value (block 406). Subsequent to execution of block 406, the memory buffer is again operating in regular memory latency mode, and at block 407 execution loops back to the beginning.

In accordance with one embodiment of the present invention, instructions adapted to be executed to perform a method in accordance with an embodiment of the present invention are stored on a computer-readable medium. The computer-readable medium can be any device adapted to store digital information. The computer-readable medium can be distributed to a user that has a processor suitable for executing instructions adapted to be executed. The term "adapted to be executed" is meant to encompass any instructions that are ready to be executed in their present form (e.g., machine code) by a processor, or require further manipulation (e.g., compilation, decryption, or provided with an access code, etc.) to be ready to be executed by a processor.

Embodiments of the present invention advantageously allow memory buffer pre-loading for memory service interruptions. In an embodiment having regular memory latency service interruptions and worst case latency to memory service interruptions, memory buffer watermark and/or burst size values can be modified to provide efficient system performance. Embodiments of the present invention may provide for an increase in the proportion of low priority, longer burst size data requests, which can result in greater page hit rates to memory.

In the foregoing detailed description, apparatus and methods in accordance with embodiments of the present invention have been described with reference to specific exemplary embodiments. Accordingly, the present specification and figures are to be regarded as illustrative rather than restrictive.

What is claimed is:

1. A method to control the loading of a memory buffer, the memory buffer having a watermark with a first watermark value, the method comprising:

receiving an advance indication of a memory service interruption by a memory controller, wherein the received advance indication occurs prior to the memory service interruption; and based at least in part on the received advance indication of the memory service interruption, modifying the watermark to have a second watermark value different from the first watermark value.

2. The method of claim 1, wherein the memory buffer having a watermark has a below-watermark burst size with a first burst size value, the method further comprising:

based at least in part on the received advance indication of the memory service interruption, modifying the below-watermark burst size to have a second burst size value different from the first burst size value.

3. The method of claim 1, wherein the indication of a memory service interruption includes an advance indication of a memory service interruption having a worst case latency to memory.

4. The method of claim 1, wherein the second watermark value is greater than the first watermark value.

5. The method of claim 2 wherein the second burst size value is less than the first burst size value.

6. The method of claim 2 wherein the second burst size value corresponds to difference between the number of data entries in the memory buffer and the second watermark value.

7. The method of claim 1, the method further comprising:

receiving an indication of the termination of the memory service interruption; and based at least in part on the received indication of the termination of the memory service interruption, modifying the watermark to have a third watermark value different from the second watermark value.

8. The method of claim 7, wherein the third watermark value equals the first watermark value.

9. The method of claim 2, the method further comprising:

receiving an indication of the termination of the memory service interruption;

based at least in part on the received indication of the termination of the memory service interruption, modifying the watermark to have a third value different from the second watermark value; and based at least in part on the received indication of the termination of the memory service interruption, modifying the below-watermark burst size to have a third burst size value different from the second burst size value.

10. The method of claim 9, wherein the third watermark value equals the first watermark value, and wherein the third burst size value equals the first burst size value.

11. A method to control the loading of a memory buffer, the memory buffer having a watermark with a first watermark value, the method comprising:

modifying the watermark based at least in part on the received advance indication by a memory controller of a memory service interruption, wherein the received advance indication occurs prior to the memory service interruption, to have a second watermark value, the second watermark value being different than the first watermark value; and modifying the watermark to have a third watermark value subsequent to the occurrence of the memory service interruption, the third watermark value being different than the second watermark value.

12. The method of claim 11, wherein the third watermark value equals the first watermark value.

13. The method of claim 11, wherein the memory buffer having a watermark with a first watermark value has an below-watermark burst size with a first burst size value, the method further comprising:

modifying the below-watermark burst size to have a second burst size value prior to the occurrence of a memory service interruption, the second burst size value being different than the first burst size value; and modifying the below-watermark burst size to have a third burst size value subsequent to the occurrence of the memory service interruption, the third burst size value being different than the second burst size value.

14. The method of claim 13, wherein the first burst size value is equal to the third burst size value.

15. An apparatus to control the loading of a memory buffer, comprising:

a memory buffer; and a memory controller to receive an advance indication signal of a memory service interruption, coupled to said memory buffer, including:

a watermark register;

a first register, coupled to said watermark register, to store a first watermark value; and a second register, coupled to said watermark register, to store a second watermark value.

16. The apparatus of claim 15, wherein the memory controller includes:

a below-watermark burst size register;

a third register, coupled to said below-watermark burst size register, to store a first below-watermark burst size value; and a fourth register, coupled to said below-watermark burst size register, to store a second below-watermark burst size value.

17. The apparatus of claim 15, wherein the memory controller is to:

read the second watermark value from said second register based at least in part on the received advance indication signal of a memory service interruption; and store the second watermark value in said watermark register.

18. The apparatus of claim 16, wherein the memory controller is to:

read the second watermark value from said second register based at least in part on the received advance indication signal of a memory service interruption; and store the second watermark value in said watermark register;

read the second below-watermark burst size value from said fourth register based at least in part on the received advanced indication signal of a memory service interruption; and store the second below-watermark burst size value in said below-watermark burst size register.

19. A system to process video signals, the system comprising:
- a processor;
- a memory, coupled to said processor;
- a memory buffer, coupled to said memory; and
- a memory controller to receive an advance indication signal of a memory service interruption, coupled to said memory buffer, including:
- a watermark register;
- a first register, coupled to said watermark register, to store a first watermark value; and
- a second register, coupled to said watermark register, to store a second watermark value.

20. The system of claim 19, wherein the memory controller is to:
- read the second watermark value from said second register based at least in part on the received advance indication signal of a memory service interruption; and
- store the second watermark value in said watermark register.

21. A computer-readable medium storing a plurality of instructions to be executed by a processor to control a memory buffer having a watermark with a first watermark value and a below-watermark burst size with a first burst size value, said plurality of instructions comprising instructions to:
- receive an advance indication of a memory service interruption by a memory controller, wherein the received advance indication is to occur prior to the memory service interruption; and
- based at least in part on the received advance indication of the memory service interruption, modify the watermark to have a second watermark value different from the first watermark value.

22. The computer-readable medium of claim 21, further comprising instruction to:
- based at least in part on the received advance indication of the memory service interruption, modify the below-watermark burst size to have a second burst size value different from the first burst size value.

23. An apparatus comprising:
- a memory buffer; and
- a memory controller coupled to said memory buffer, said memory controller to operate in a first mode maintaining a first level of buffering in said memory buffer and to switch to a second mode maintaining a second level of buffering that is higher than the first level of buffering in response to an advance indication signal of a memory service interruption.

24. The apparatus of claim 23 wherein said memory service interruption is a DRAM refresh operation.

25. The apparatus of claim 23 wherein said memory service interruption is a memory maintenance operation.

26. The apparatus of claim 23 wherein said first mode has an associated first burst size and said second mode has an associated second burst size.

27. The apparatus of claim 23 wherein said memory buffer is a video buffer to buffer a video stream retrieved from memory.

28. An apparatus comprising:
- a video stream buffer;
- a memory controller to occasionally perform an operation causing a memory service interruption; and
- control logic coupled to said video stream buffer to maintain a first level of buffering in a first mode and to maintain a higher level of buffering prior to said memory controller performing said operation causing said memory service interruption.

29. The apparatus of claim 28 wherein said operation is a DRAM refresh operation.

30. The apparatus of claim 29 further comprising a processor, wherein said processor, said video stream buffer, said memory controller, and said control logic are all integrated into a single integrated circuit.

* * * * *

UNITED STATES PATENT AND TRADEMARK OFFICE
CERTIFICATE OF CORRECTION

PATENT NO. : 6,859,851 B1 Page 1 of 1
APPLICATION NO. : 09/466964
DATED : February 22, 2005
INVENTOR(S) : Gad S. Sheaffer It is certified that error appears in the above-identified patent and that said Letters Patent is hereby corrected as shown below:

Column 9, line 35: "to difference"
    should be --to the difference--

Column 10, line 13: "value has an"
    should be --value has a--

Signed and Sealed this

Fifteenth Day of August, 2006

JON W. DUDAS
*Director of the United States Patent and Trademark Office*